US000001805H

United States Statutory Invention Registration [19]

[11] Reg. Number: H1,805

[45] Published: Oct. 5, 1999

Rider et al.

[54] PAPER GUIDE FOR HIGH SPEED DOCUMENT REPRODUCTION

[75] Inventors: Jason P. Rider, Fairport; Russell C. Rackett, Webster; Joseph S. Vetromile, Rochester; Geoffrey C. Williams, Penfield, all of N.Y.

[73] Assignee: Xerox Corporation, Stamford, Conn.

[21] Appl. No.: 08/664,582

[22] Filed: Jun. 17, 1996

[51] Int. Cl.[6] ..... B65H 29/20

[52] U.S. Cl. ..... 271/314

[58] Field of Search ..... 271/314, 207, 271/176, 182, 220

[56] References Cited

U.S. PATENT DOCUMENTS

| | | | |
|---|---|---|---|
| 4,155,643 | 5/1979 | Ladds et al. | 271/207 X |
| 4,569,514 | 2/1986 | Holtje | 271/314 |
| 5,215,300 | 6/1993 | Hiroi et al. | 271/182 X |

FOREIGN PATENT DOCUMENTS

| | | | |
|---|---|---|---|
| 55-69162 | 5/1980 | Japan | 271/207 |
| 5338899 | 12/1993 | Japan | 271/207 |

*Primary Examiner*—Charles T. Jordan
*Assistant Examiner*—Meena Chelliah
*Attorney, Agent, or Firm*—Michelle W. Waites

[57] ABSTRACT

This invention discloses a method and apparatus for properly placing copy sheets from a high speed copy machine into an exit tray. The invention utilizes a variable speed motor to control the rollers which reside at the end of the paper path. One or more paper guides mounted to the drive rollers, enable the motor to operate over a wide range of speeds, yet still work efficiently. The motor accelerates to its highest speed as the copy sheet enters the nip between the drive and idler rollers, and is decelerated to its slowest speed as the trailing edge of the copy sheet exits the nip. The trailing edge of the copy sheet then moves off of the roller and onto the paper guide. The speed of the motor can then be increased without having to wait for the copy sheet to move into the output area. This substantially reduces the period of time required to reproduce copies.

11 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PAPER GUIDE FOR HIGH SPEED DOCUMENT REPRODUCTION

This invention relates generally to exit tray stacking in printers or copiers, and more particularly concerns a guide for properly placing copy sheets in an exit tray.

BACKGROUND OF THE INVENTION

As xerographic copiers and printers of all kinds increase in speed, it has become increasingly important to provide devices that can stack copy sheet output in a reliable manner. AS the output speed of these copy machines is increased, the first sheets to exit the paper path do not always have time to settle to the bottom of the stacking tray before succeeding sheets are forced into the trays by the transport systems of the machines. This often results in paper jams in the trays, and prevents the machine from operating properly.

The high rate of speed also causes stacking problems because force generated by the exit rolls sends each copy sheet so far up the stacking ramp that the following copy sheet runs into the trail edge of the previous copy sheet before that sheet has an opportunity to settle down the stacking ramp. Also, the trail edge of preceding copy sheets are sometimes lifted up and out of the stacking tray by the lead edges of incoming sheets because of a small interdocument sheet gap.

Each copy sheet must pass through the nip—a small gap that lies at the interface between the drive and idler rollers—as it exits the copy machine. Drive rollers are sometimes driven by motors which operate at varying speeds. For example, a Low Sheet Energy Uphill (LSEU) servo system operates at 1430 mm/s as the copy sheet enters the nip, and decelerates to 226 mm/s as the last 10 mm of the sheet passes between the rolls. The drop in speed allows the energy in the sheet to dissipate before the sheet exits the nip, thereby allowing the sheets to stack properly in the output tray. Once the copy sheet has exited the nip, the LSEU motor speeds up to receive the next incoming copy sheet.

In the example given, each sheet has a cycle time of 333 ms. That is, the sheet has 333 ms to move into the output tray after it enters the nip. Most of this time is used to accelerate and decelerate the motor. The current stacking method requires the motor to remain at a very low speed for an extended period of time, so that each of the preceding copy sheets can move away from the nip, and toward the bottom of the exit tray before the next sheet enters. The motor is accelerated in time to move the next sheet into the nip as the previous one moves toward the exit tray. If the motor accelerates too soon, the first sheet will not have had enough time to exit the nip, and the high speed acceleration profile will force the trailing edge of the sheet off of the rolls at a rapid pace, and cause the sheet to stack poorly. Thus, if the above method is used the advantage gained by increasing the maximum speed of a variable speed motor will be lost because the rollers will be forced to wait at the low speed while the exiting copy sheet moves out of the paper path.

There is a need, which the present invention addresses, for new apparatus which can rapidly move an exiting copy sheet away from the nip, such that a variable speed motor can accelerate and decelerate without having to wait an extended period of time before the next copy sheet can exit the paper path.

The following disclosures may be relevant to various aspects of the present invention and may be briefly summarized as follows:

U.S. Pat. No. 5,029,743 to McNew discloses a system for passing long fan-folded documents and corresponding copy paper through a reproducing apparatus. It includes a collapsible, upright stand which carries a pair of copy paper roll supporting elements, a pair of paper guide plates pivotably and detachably connected to the top of the stand, and a guide bar for guiding copy paper from a roll on the stand to the guide plates.

U.S. Pat. No. 4,789,150 to Plain discloses a sheet stacking apparatus for use with throughput from high speed copiers or printers. It includes dual control flaps which act independently to provide positive control of sheets being stacked in the apparatus.

U.S. Pat. No. 4,627,718 to Wyer discloses a sheet curl control apparatus comprising a pair of co-acting rolls and baffle means positioned relative to said rolls so as to bend a sheet passing between the rolls about one of said rolls.

U.S. Ser. No. 08/583907 filed Jan. 11, 1996 by Jason P Rider et al. discloses an apparatus for corrugating copy sheets traveling at high rates of the speed toward an exit tray. The invention includes an idler shaft with idler rollers mounted upon it, and a drive shaft with drive rollers thereon. The drive shaft is positioned relative to the idler shaft such that one of the drive rollers is positioned between two of the idler rollers. The invention also provides means for applying different forces on the copy sheets passing between the idler rollers and the drive rollers.

U.S. Pat. No. 4,477,068 to Arter et al. discloses a document feeder for automatically inverting a duplexed original so that the second side may be copied. The inverting mechanism is a turnaround roll placed at the exit of the copy station, which cooperates with rollers located within the copy machine.

U.S. Pat. No. 4,407,597 to Kapp discloses a paper feeding apparatus which includes paper storage means for storing individual sheets of paper and feeding means for feeding a sheet of paper from the paper storage means in a paper feed direction along the paper feed path to the paper drive means. Guide means are provided having a first surface positioned along the paper feed path on the side opposite the paper storage means and extending parallel to the paper feed path to define a portion of the paper feed path. Means are also provided for defining a paper passageway between the second surface of the guide means and the paper feed path.

All of the references cited herein are incorporated by reference for their teachings.

Accordingly, although known apparatus and processes are suitable for their intended purposes, a need remains for an apparatus which can move an exiting copy sheet away from a nip, and enable a variable speed motor to operate at high speeds without having to wait for a previous copy sheet to clear the paper path before the next sheet can enter the nip.

SUMMARY OF THE INVENTION

In accordance with one aspect of the present invention, there is provided an apparatus for transporting copy sheets traveling at high rates of speed from a paper path to an exit tray, which includes a drive roller arrangement defining a nip through which copy sheets may pass, the drive roller arrangement located between an end of the paper path and an input to the exit tray; a transport system which moves a copy sheet along the paper path, and advances the copy sheet from the paper path to the nip; and a paper guide connected to the drive roller arrangement, such that a trailing edge of the copy sheet moves away from the drive roller arrangement and onto the paper guide as the copy sheet exits the nip.

In accordance with another aspect of the invention there is provided a method for transporting copy sheets traveling at high rates of speed, from a paper path to an exit tray, which includes moving the copy sheet along the paper path; advancing a leading edge of the copy sheet to a nip between a drive roller arrangement; transporting the copy sheet between the rollers; driving the trailing edge from the rollers to a paper guide; and directing the copy sheet from the nip to the exit tray.

Pursuant to yet another aspect of the invention there is provided an apparatus for transporting copy sheets traveling at high rates of speed from a paper path to an exit tray, which includes means for moving a copy sheet along the paper path; means for transporting the copy sheet from the paper path to the exit tray; means for advancing a leading edge of the copy sheet from the paper path to the transporting means; means for controlling a motion of the copy sheet as it moves through the transporting means; and means for guiding the copy sheet toward the exit tray.

Use of this invention can allow exiting copy sheets to stack properly in the output section of a copy machine. The invention provides an arrangement for moving the exiting copy sheet away from the rollers, so they can be speed up without affecting the motion of the paper. Otherwise, subsequent sheets would not be able to enter the nip until the previous sheets were completely out of the paper path. This would produce a significant decline in the number of copies that could be reproduced in any given time period.

BRIEF DESCRIPTION OF THE DRAWINGS

Other features and advantages of the present invention will become apparent as the following description proceeds and upon reference to the drawings, in which.

DETAILED DESCRIPTION OF THE PREFERRED EMBODIMENT

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
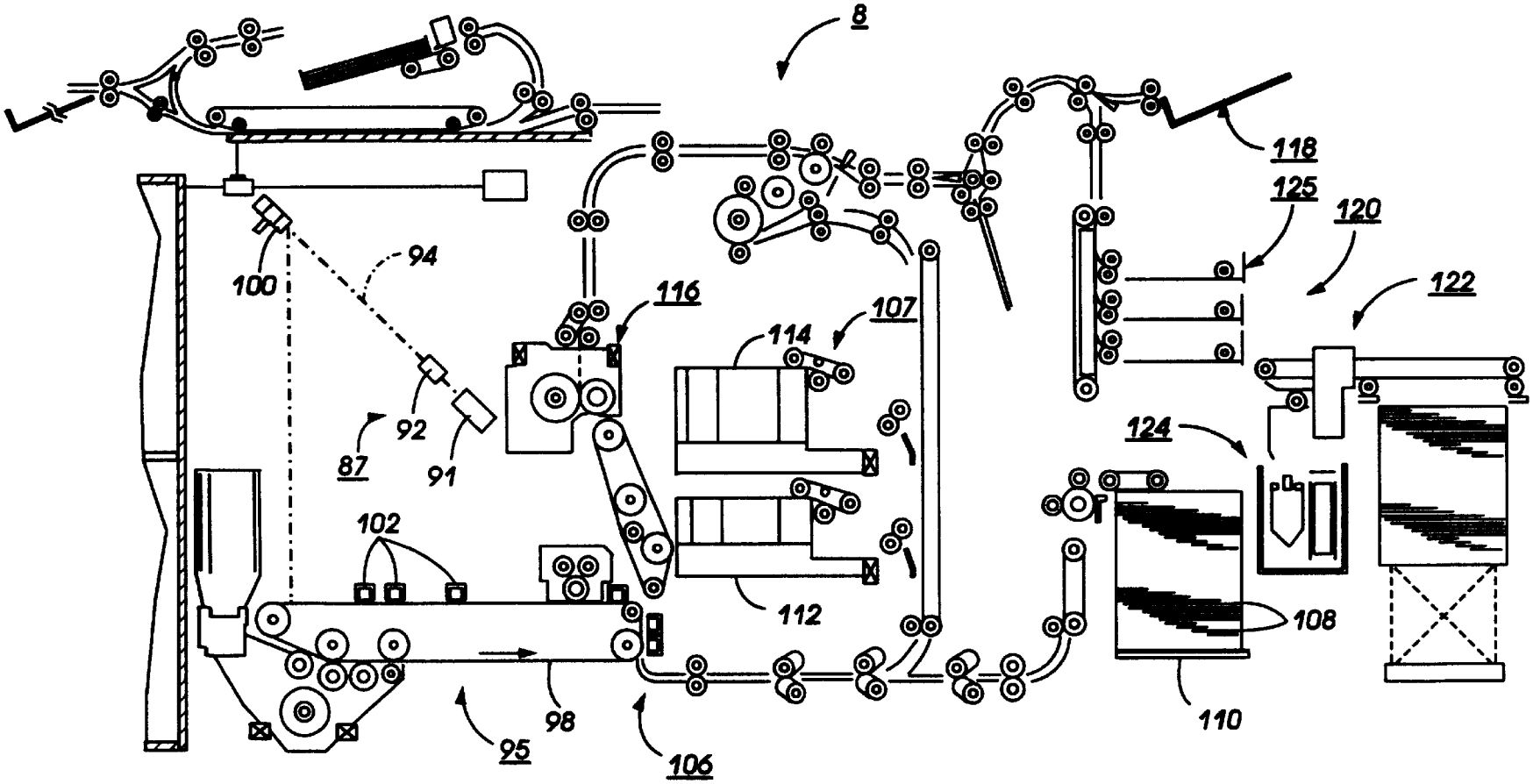
FIG. 1 is an elevation view illustrating the principal mechanical components of a typical printing system.

Referring now to the drawings, the various processing stations employed in a typical printing machine are depicted in FIG. 1. Printer section 8 comprises a laser type printer and for purposes of explanation is separated into a Raster Output Scanner (ROS) section 87, Print Module Section 95, Paper Supply section 107, and Finisher 120. ROS 87 has a laser, the beam of which is split into two imaging beams 94. Each beam 94 is modulated in accordance with the content of an image signal input and in this example, by acousto-optic modulator 92, to provide dual imaging beams 94. Other arrangements for modulating beams 94 are possible, and the invention is not limited to this embodiment. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. After exposure with beams 94, the latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the l developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to output collating trays in finisher 120. Finisher 120 includes a stitcher 122 for stitching (stapling) the prints together to form books, a thermal binder 124 for adhesively binding the prints into books and a stacker 125. A finisher of this type is disclosed in U.S. Pat. Nos. 4,828,645 and 4,782,363 whose contents are hereby incorporated by reference.

Figure 2:
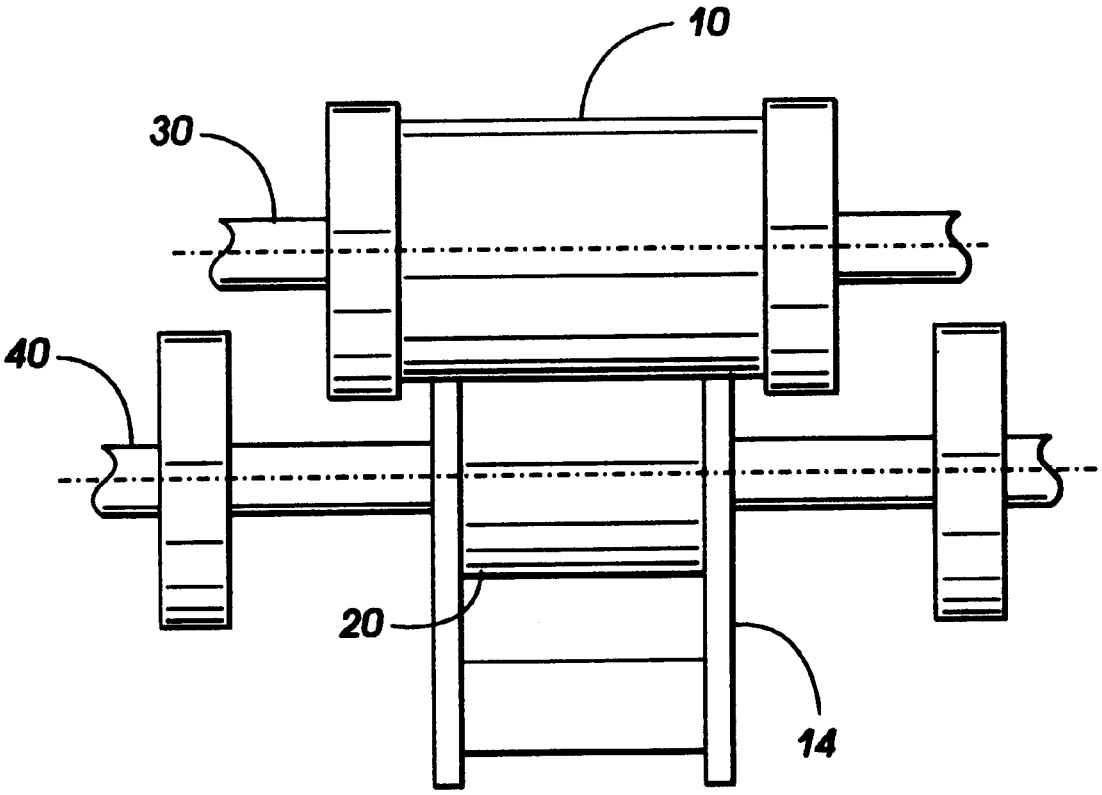
FIG. 2 is a front elevation view of the exit guide of the present invention attached to a drive and idler roll combination.

Reference is now made to FIG. 2, which shows a front elevation view of idler roller 10, paper guide 14, and drive roller 20. Drive roller 20, located on drive shaft 40, is positioned adjacent to idler roller 10, towards the center of idler roller 10. Idler roller 10 is located on idler shaft 30.

In order to reproduce documents at speeds of more than 180 copies per minute, exit speeds of the copy sheet must be very high. For example, an exiting copy sheet speed of 1430 mm/s is required for a machine that reproduces documents at a rate of 180 copies per minute. Unfortunately, exit speeds of this magnitude are so high that the exiting copy sheet often moves past output tray 118 or finisher 120 when it exits the paper path. Copy sheets that move at this pace typically move far up the exit path. A typical copy sheet is relatively light weight with a large surface area. Therefore it will take the sheet a long time to fall back down through the air and settle at the bottom of the paper path. Thus, copy sheets often collide with one another as they attempt to stack in output tray 118. One solution to these problems has been to reduce the speed of the exiting copy sheets just before they exit nip 18. This is accomplished by slowing down drive roller 20 before the copy sheet moves out of the nip, and into tray 118 or finisher 120. If drive roller 20 is slowed down enough, the energy in the sheet of paper will dissipate before the trailing edge of the exiting copy sheet leaves the nip. The sheets of paper will then stack properly in the output tray. The drive roll can then be sped back up to receive the next sheet.

This process is successful as long as the range of speeds at which the copy sheet will travel does not exceed a certain level. Copy sheets will typically be subjected to a drastic change in speed as copier speeds are increased. Continuing with the above example, a machine that produces 180 copies per minute is slowed down to less than 226 mm/s as the copy sheet exits the nip. The motor is then accelerated to the maximum speed of 1430 mm/s in order to grab the next sheet. Accelerating and decelerating over such a wide range a speeds takes a relatively long time. This means that for higher maximum speeds, the time each sheet must wait to enter the nip will increase, since the exit system must wait for the drive roll to build up speed. Otherwise, the trailing edge of the exiting sheet, will be ejected at a high speed when the motor accelerates to accept the next sheet, resulting in uncontrolled and poor stacking of the finished copy sheets. This problem is eliminated using the present invention.

With continued reference to FIG. 2, the present invention discloses a paper guide 14 which can be attached to drive shaft 40 around to drive roller 20. As the copy sheet passes through the drive and idler rolls and exits nip 18, the sheet will ride along paper guide 14 instead of drive roller 20. The motion of the sheet will be independent of that of drive roller 20 when it moves along paper guide 14. Thus, when drive roller 20 is accelerated to accept the next sheet, motion of the exiting copy sheet will not be affected. Use of the present invention eliminates the wait time previously required for the motor to accelerate to the desired speed.

Figure 3:
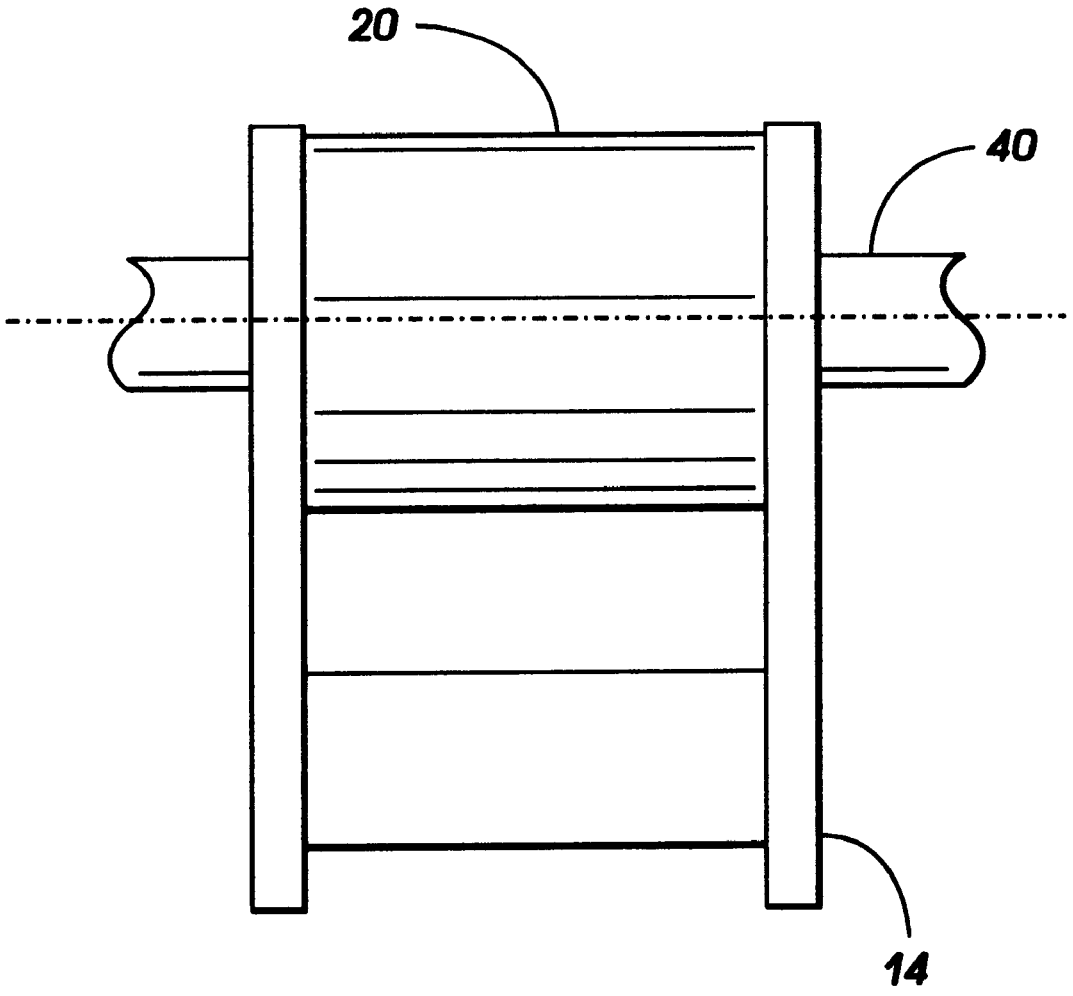
FIG. 3 is a front elevation view of the exit paper guide of the present invention.
Figure 4:
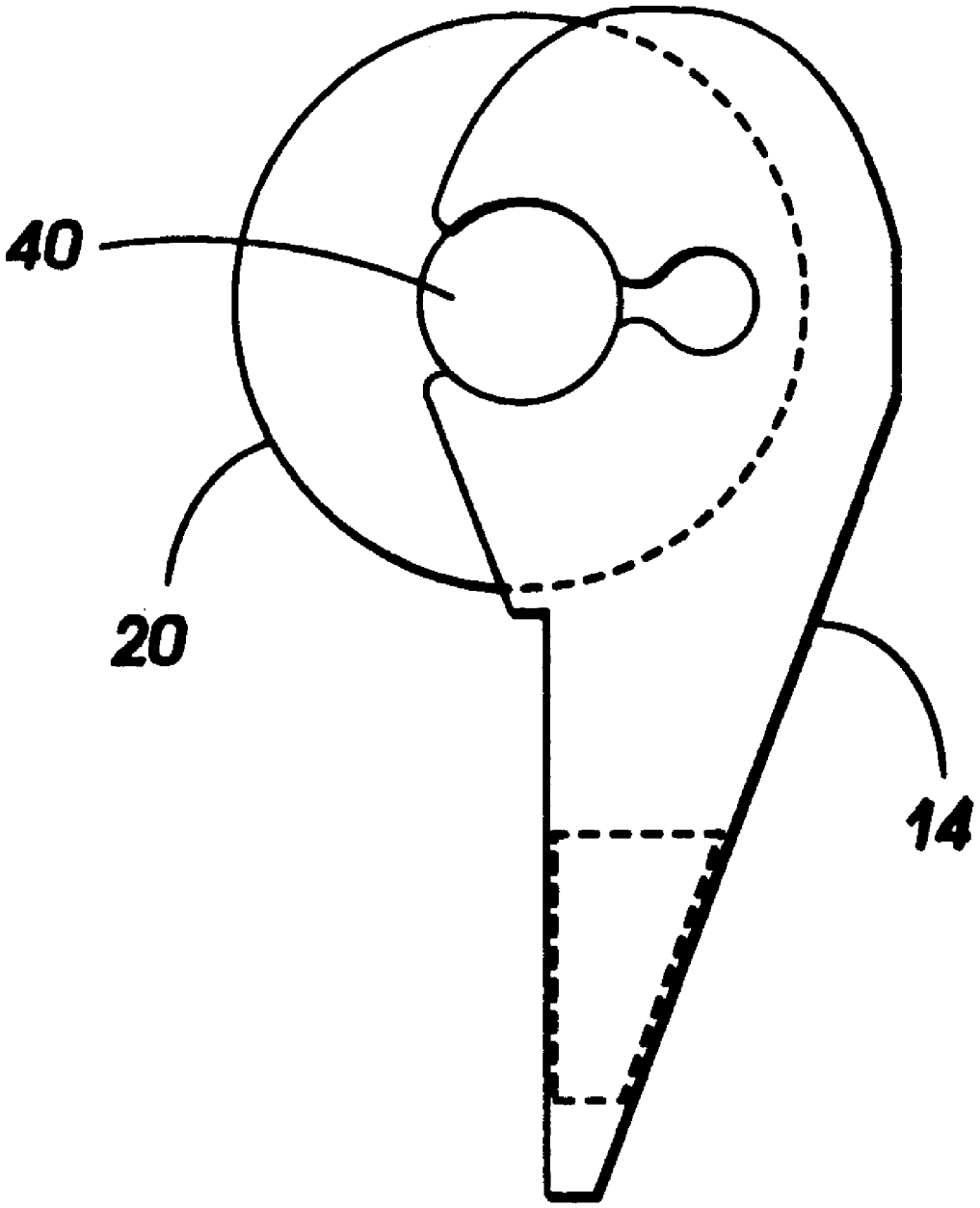
FIG. 4 is a side elevation view of the exit paper guide of the resent invention.

FIGS. 3 and 4 are detailed front and side views respectively of the exit paper guide of the present invention. As shown, paper guide 14 clips onto drive shaft 40 around drive roller 20. As best illustrated in FIG. 4, the top of paper guide 14 extends slightly above the top surface of drive roller 20. This causes the copy sheets to lift off of drive roller 20, and to move along paper guide 14.

Figure 5:
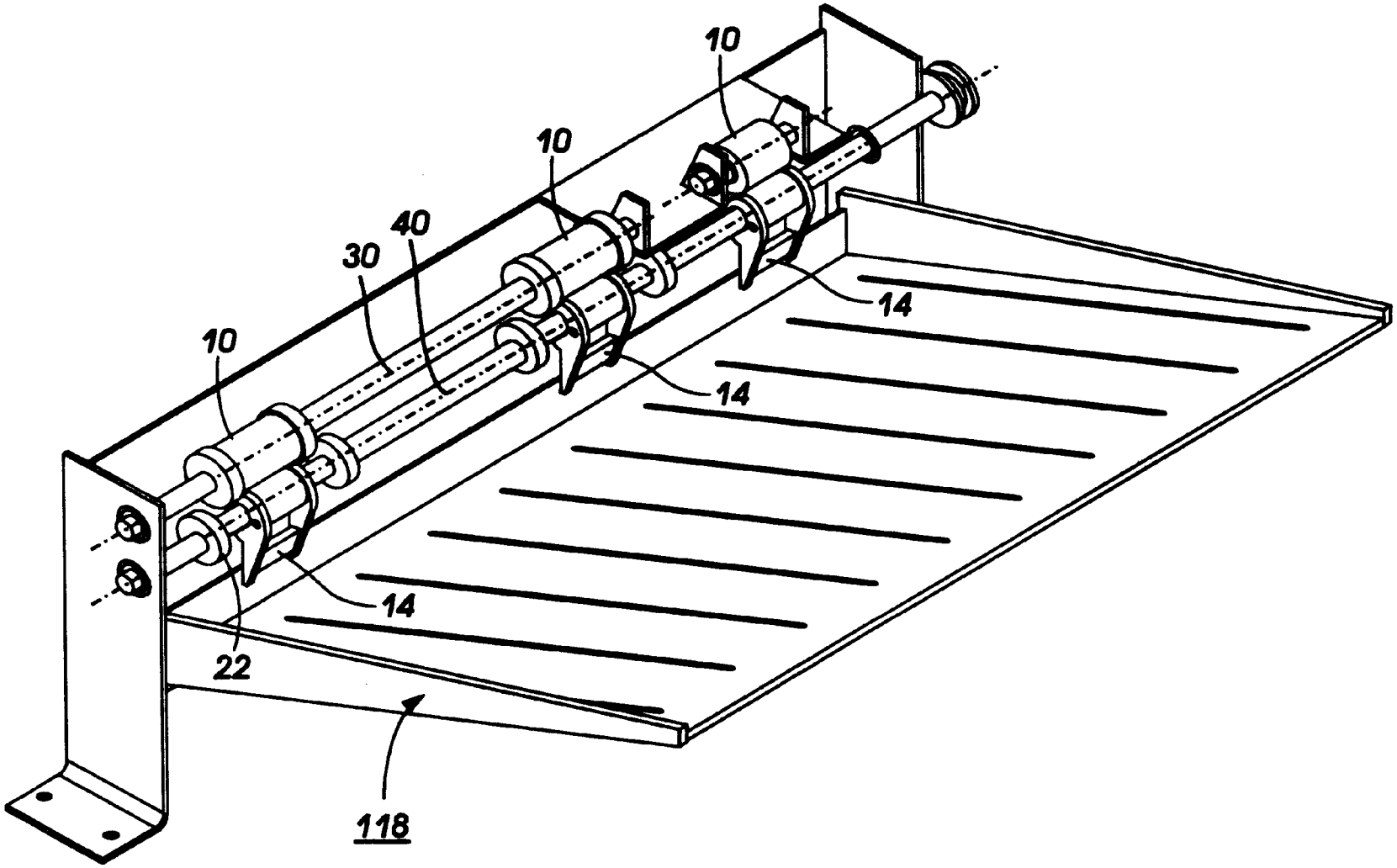
FIG. 5 is an elevation schematic of the exit guide of the present invention, attached to an exit tray system with which it will typically be used.

Reference is now made to FIG. 5, which shows an elevation schematic view of an exit tray system incorporating the present invention. Multiple drive and idler rolls are spaced along drive shaft 40 and idler shaft 30 to provide adequate support for the exiting copy sheets. One paper guide 14 will typically be placed around each drive roller 20.

In recapitulation, the present invention utilizes variable speed motor to control the drive shaft and drive rollers of a typical electrophotographic printing machine. Paper guides are mounted to the drive rollers to enable a motor that operates over a wide range of speeds to work in the most efficient manner. The motor accelerates to its highest speed as the copy sheet enters the nip between the drive and idler rollers. The motor is decelerated to its slowest speed as the trailing edge of the copy sheet exits the nip. The paper guide of the present invention will then remove the trailing edge of the exiting sheet from the nip. This allows the speed of the motor to be increased before the exiting sheet is completely out of the way, thereby eliminating a substantial amount of the time the motor would otherwise have to remain at low speed. The motor can begin to accelerate before the copy sheet has moved completely out of the paper path, and the machine can reach its desired high speed rate of output.

It is, therefore, apparent that there has been provided in accordance with the present invention, a paper guide for high speed document reproduction that fully satisfies the aims and advantages hereinbefore set forth. While this invention has been described in conjunction with a specific embodiment thereof, it is evident that many alternatives, modifications, and variations will be apparent to those skilled in the art.

Accordingly, it is intended to embrace all such alternatives, modifications and variations that fall within the spirit and broad scope of the appended claims.

What is claimed is:

1. An apparatus for transporting copy sheets from a paper path to an exit tray, comprising:

a) a variable speed drive roller arrangement defining a nip through which copy sheets may pass, said drive roller arrangement located between an end of the paper path and the exit tray, said drive roller arrangement advancing sheets from the paper path to the exit tray;

b) a transport system to move a copy sheet along the paper path, and advance the copy sheet from the paper path to said nip at a high rate of speed, and to expel the copy sheet from said nip at a low rate of speed; and c) a paper guide arranged with respect to said drive roller arrangement, such that a trailing edge of the copy sheet passed through said nip moves away from said drive roller arrangement and onto said paper guide as the copy sheet exits said nip.

2. An apparatus for transporting copy sheets as recited in claim 1 wherein said paper guide causes a trailing edge of the copy sheet to have a motion independent of a motion of said drive roller arrangement.

3. An apparatus for transporting copy sheets as claimed in claim 1 wherein said high rate of speed is more than five times greater than said low rate of speed.

4. An apparatus for transporting copy sheets as claimed in claim 1 wherein said high rate of speed is approximately equal to 1430 millimeters per second.

5. An apparatus for transporting copy sheets as claimed in claim 1 wherein said low rate of speed is approximately equal to 226 millimeters per second.

6. A method for transporting copy sheets from a paper path to an exit tray, comprising:

a) moving the copy sheet along the paper path;

b) advancing, at a high rate of speed, a leading edge of the copy sheet to a nip formed at a drive roller arrangement, said drive roller arrangement having at least one roller;

c) advancing the copy sheet through said nip with said drive roller arrangement;

d) expelling, at a low rate of speed, said copy sheet trailing edge from said roller to a paper guide; and e) guiding the copy sheet along said paper guide with a motion independent from said drive roller arrangement to said exit tray.

7. A method of transporting copy sheets as claimed in claim 6 wherein said high rate of speed is more than five times greater than said low rate of speed.

8. A method of transporting copy sheets as claimed in claim 6 wherein said high rate of speed is approximately equal to 1430 millimeters per second.

9. A method of transporting copy sheets as claimed in claim 6 wherein said low rate of speed is approximately equal to 226 millimeters per second.

10. An apparatus for transporting copy sheets traveling at high rates of speed from a paper path to an exit tray, comprising:

a) means for moving a copy sheet along the paper path;

b) means for transporting the copy sheet from the paper path to the exit tray;

c) means for advancing a leading edge of the copy sheet from the paper path to said transporting means;

d) means for controlling a motion of said copy sheet by varying its speed as the copy sheet moves through said transporting means; and e) means for guiding the copy sheet toward the exit tray.

11. An apparatus for transporting copy sheets as claimed in claim 10 wherein said copy sheet speed varies between approximately 1430 millimeters per second and approximately 226 millimeters per second.

* * * * *